D. B. Cox.
Damper.
Nº 80,920. Patented Aug. 11, 1868.
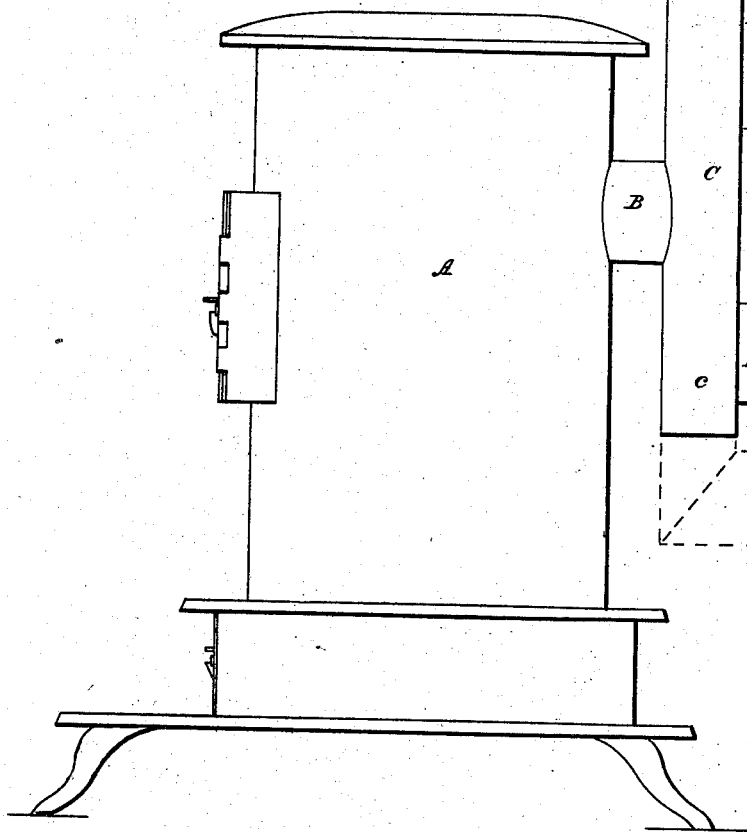
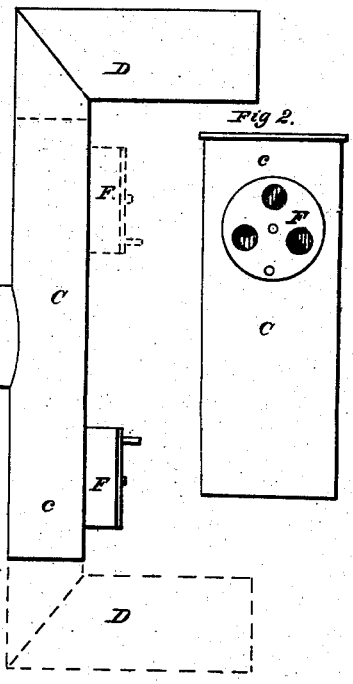
Witnesses,
Wm. F. Browne
A. S. Van Vranken
Inventor,
David B. Cox,
By his atty.
J. S. Brown

United States Patent Office.

DAVID B. COX, OF TROY, NEW YORK.

Letters Patent No. 80,920, dated August 11, 1868.

IMPROVEMENT IN DAMPERS.

*The Schedule referred to in these Letters Patent and making part of the same.*

TO ALL WHOM IT MAY CONCERN:

Be it known that I, DAVID B. Cox, of Troy, in the county of Rensselaer, and State of New York, have invented a Reversible Ventilating-Check Damper for Stoves; and I do hereby declare that the following is a full and exact description thereof, reference being had to the accompanying drawings, making part of this specification—

Figure 1 being a side elevation of a stove with my reversible damper applied thereto.

Figure 2, a face view of the damper, with a section of the pipe to which it is attached.

Like letters designate corresponding parts in both figures.

Let B represent the outlet-pipe, or thimble, of the stove A.

Sometimes the pipe C is required to extend upward from the outlet B, as indicated by black lines D, and sometimes downward, as indicated by red lines D in fig. 1.

It is very desirable that the air admitted through the ventilating-check damper F should flow into the pipe and join the draught from the stove, in the same direction as said draught passes. Thus, if the pipe extends upward from the outlet, the check-damper should be applied so that the air shall ascend in joining the draught, and *vice versa*.

By the application of my simple invention, with one damper, the pipe may be applied so as to extend either upward or downward, and yet the air be admitted in the direction of the draught, as desired.

The invention consists in the attachment of the damper F to a closed extension, c, of the pipe C, in the direction opposite to that of the regular portion of the pipe. This extension need not be of any great extent, just sufficient for attaching the damper, and for fully turning the air admitted thereby in the direction of the draught of the stove.

Thus constructed, all that is required is to turn the damper-extension c downward, if the stove-pipe is required to extend upward, as shown by black lines in fig. 1, or to turn the extension upward, if the stove-pipe is to turn downward, as indicated by red lines in the same figure.

It is not absolutely essential that the direction of the extension should be opposite to that of the pipe, a different direction, at some other angle than opposite, might serve the purpose, though not so well in all respects.

What I claim as my invention, and desire to secure by Letters Patent, is—

The reversible ventilating-check damper, consisting of a damper F, attached to an extension, c, of the stove-pipe C, projecting in a direction opposite to or different from the said pipe, and reversible with it, substantially as and for the purpose herein specified.

The above specification of my reversible ventilating-check damper, signed by me, this twenty-sixth day of March, 1868.

DAVID B. COX.

Witnesses:
J. S. BROWN,
EDM. F. BROWN.